(12) United States Patent
Takeuchi (10) Patent No.: US 8,161,383 B2
(45) Date of Patent: Apr. 17, 2012

(54) INFORMATION PROCESSING APPARATUS AND INFORMATION PROCESSING METHOD

(75) Inventor: Tomoyuki Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 12/042,975

(22) Filed: Mar. 5, 2008

(65) Prior Publication Data

US 2009/0006949 A1   Jan. 1, 2009

(30) Foreign Application Priority Data

Jun. 26, 2007 (JP) .................................. 2007-167933

(51) Int. Cl.
*G06F 17/00* (2006.01)

(52) U.S. Cl. ........ 715/273; 715/229; 715/234; 715/246; 715/255; 715/272; 713/178; 713/168

(58) Field of Classification Search .................. 715/255, 715/273, 229, 234, 246, 272; 713/168, 178
See application file for complete search history.

(56) References Cited

U.S. PATENT DOCUMENTS

| | | | |
|---|---|---|---|
| 7,035,817 B1 | 4/2006 | Brothers | |
| 7,099,846 B1 * | 8/2006 | Ishibashi et al. | 705/51 |
| 7,287,010 B1 * | 10/2007 | Ishibashi | 705/52 |
| 8,074,260 B2 * | 12/2011 | Hsu et al. | 726/2 |
| 2001/0002485 A1 * | 5/2001 | Bisbee et al. | 713/167 |
| 2005/0216417 A1 | 9/2005 | Risan et al. | |
| 2005/0289345 A1 * | 12/2005 | Haas et al. | 713/170 |
| 2006/0041754 A1 * | 2/2006 | Hind et al. | 713/176 |
| 2006/0287956 A1 * | 12/2006 | Higashi et al. | 705/51 |
| 2008/0040781 A1 * | 2/2008 | Keiser et al. | 726/5 |
| 2008/0040808 A1 * | 2/2008 | Tokie | 726/26 |
| 2008/0065598 A1 * | 3/2008 | Ritter | 707/3 |
| 2008/0162666 A1 * | 7/2008 | Ebihara et al. | 709/217 |
| 2008/0183595 A1 * | 7/2008 | Sakamoto | 705/26 |
| 2008/0208871 A1 * | 8/2008 | Ishibashi | 707/10 |
| 2009/0147960 A1 * | 6/2009 | Maeda et al. | 380/277 |
| 2010/0067705 A1 * | 3/2010 | Boccon-Gibod et al. | 380/285 |
| 2010/0325653 A1 * | 12/2010 | Matz | 725/28 |

FOREIGN PATENT DOCUMENTS

| | | |
|---|---|---|
| EP | 994430 A2 | 4/2000 |
| EP | 1209597 A1 | 5/2002 |
| JP | 11-296437 A | 10/1999 |

OTHER PUBLICATIONS

IEEE Internet Computing, "Secure Electronic Data Interchange over the Internet", Kyle Meadors, May 2005, pp. 82-89, vol. 9 No. 3.

* cited by examiner

*Primary Examiner* — Stephen Hong
*Assistant Examiner* — Matthew Ludwig
(74) *Attorney, Agent, or Firm* — Canon USA, Inc., I.P. Division (57) ABSTRACT

An information processing apparatus for processing documents of multiple kinds generated by applications of multiple kinds includes a data processing unit configured to process the documents of multiple kinds; a determining unit configured to execute a validity period management program in response to a request to the data processing unit to process one document among the documents of multiple kinds to determine whether the request is within a validity period associated with a content item in the document; and a switching unit configured to switch the content item that is referred to and that is to be processed by the data processing unit between when the determining unit determines that the content is not within the validity period and when the determining unit determines that the content is within the validity period.

19 Claims, 8 Drawing Sheets

| CONTENT WHOSE VALIDITY PERIOD IS MANAGED | VALIDITY PERIOD | |
|---|---|---|
| CONTENT A | 07/01/06 TO 08/31/06 | 701 |
| CONTENT B | 09/01/06 TO 11/30/06 | 702 |
| CONTENT C | 12/01/06 TO 03/31/07 | 703 |

314 — CONTENT A
315 — CONTENT B
316 — CONTENT C

| CONTENT WHOSE VALIDITY PERIOD IS MANAGED | VALIDITY PERIOD | |
|---|---|---|
| 314 — CONTENT A | 07/01/06 TO 08/31/06 | — 701 |
| 315 — CONTENT B | 09/01/06 TO 11/30/06 | — 702 |
| 316 — CONTENT C | 12/01/06 TO 03/31/07 | — 703 |

STORAGE MEDIUM, SUCH AS FD OR CD-ROM

| DIRECTORY INFORMATION |
|---|
| FIRST DATA PROCESSING PROGRAM<br>PROGRAM CODE CORRESPONDING<br>TO STEPS IN FLOWCHART SHOWN IN FIG. 4 |
| SECOND DATA PROCESSING PROGRAM<br>PROGRAM CODE CORRESPONDING<br>TO STEPS IN FLOWCHART SHOWN IN FIG. 6 |

FIG. 10

STORAGE MEDIUM, SUCH AS FD OR CD-ROM

DIRECTORY INFORMATION

FIRST DATA PROCESSING PROGRAM
PROGRAM CODE CORRESPONDING
TO STEPS IN FLOWCHART SHOWN IN FIG. 5

INFORMATION PROCESSING APPARATUS AND INFORMATION PROCESSING METHOD

BACKGROUND OF THE INVENTION

1. Field of the Invention

The present invention relates to content processing in an information processing apparatus capable of executing a document processing application.

2. Description of the Related Art

Widespread use of information processing apparatuses, such as personal computers, and network services in recent years makes it possible to deliver a variety of information including documents, motion pictures, and music from server personal computers (PCs) in the formats of electronic media.

Such delivery methods have the advantage in that the server PCs can automatically reflect or the administrators of the server PCs can manually reflect any update of the contents included in the delivered data.

However, it is not possible to update the contents included in data once downloaded from server PCs to client personal computers (PCs). Accordingly, old contents included in the data are left browsable.

In order to resolve the problem in that information about the contents downloaded from the server PCs to the client PCs cannot be updated, for example, Japanese Patent Laid-Open No. 11-296437 discloses the following method for a content management system.

First, contents are encrypted in association with an updating program for updating all or part of the contents and validity period information.

Then, a function of decrypting the contents, a function of checking the validity period, and a function of executing the updating program if the validity period has expired are installed in a program for browsing the contents in a client PC. The client PC can update and control the contents that are delivered from a server PC after downloading the contents.

A validity period management function is installed in the program for browsing or editing data in the above method. Accordingly, it is necessary to install a validity period management system as an additional function of the program and, therefore, the program cannot be independently developed.

Consequently, it is not possible to provide the validity period management function when the program is created by another person and cannot be updated. It is also not possible to notify a user of the expiration of the validity period of any content.

SUMMARY OF THE INVENTION

According to an embodiment of the present invention, an information processing apparatus for processing documents includes a data processing unit configured to process the documents; a determining unit operable, in response to a request to the data processing unit to process one document among the documents, to execute a validity period management procedure to determine whether the request is within a validity period associated with a given content item in the document; and a switching unit configured to permit the data processing unit to refer to the given content item if the determining unit determines that the request is within the validity period, and to inhibit the data processing unit from referring to the given content item if the determining unit determines that the request is not within the validity period.

According to another embodiment of the present invention, an information processing method for processing documents includes the steps of executing a validity period management procedure in response to a request to process a document to determine whether the request is within a validity period associated with a given content item in the document and permitting reference to the given content item if it is determined that the request is within the validity period and inhibiting reference to the given content item if it is determined that the request is not within the validity period.

According to another embodiment of the present invention, a storage medium storing a computer program which when loaded into an information processing apparatus and executed performs the method.

Further features and aspects of the present invention will become apparent from the following description of exemplary embodiments with reference to the attached drawings.

DESCRIPTION OF THE EMBODIMENTS

According to an aspect of the present invention, it is possible to switch a content which is included in a document and to which a document processing application refers in accordance with the validity period of the content.

According to another aspect of the present invention, it is possible to cause the application to process a document without displaying any content whose validity period has expired.

According to another aspect of the present invention, it is possible to efficiently perform a validity period management process of contents included in a document without a load on the application.

Embodiments of the present invention will herein be described with reference to the attached drawings.

Figure 1:
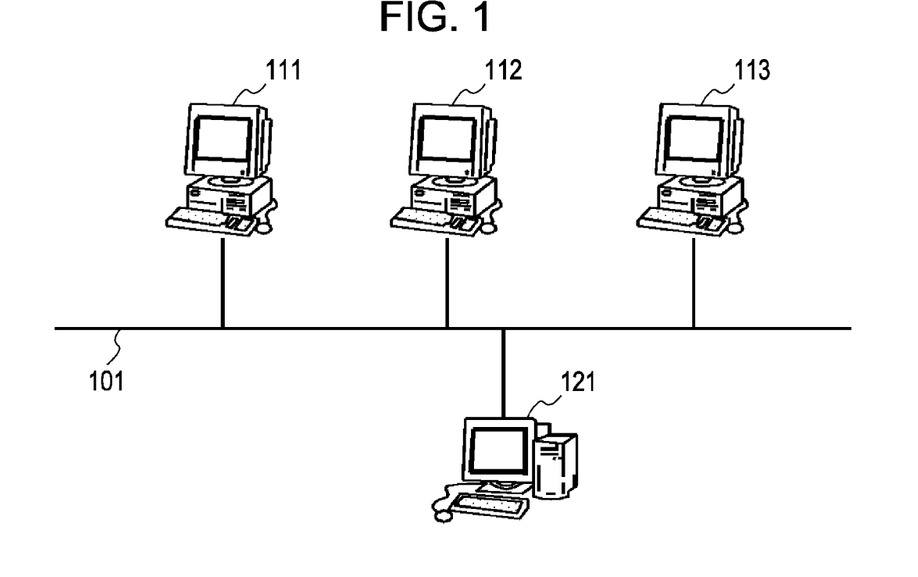
FIG. 1 illustrates an example of a data processing system to which a server apparatus according to an embodiment of the present invention is applicable.

FIG. 1 illustrates an example of a data processing system to which a server apparatus according to an embodiment of the present invention is applicable. The example illustrates a network system in which client PCs 111, 112, and 113 issue instructions or perform operations to a server PC 121 to which contents are to be provided.

Referring to FIG. 1, the client PCs 111 to 113 and the server PC 121 are connected to a network, such as a local area network (LAN) 101.

Figure 2:
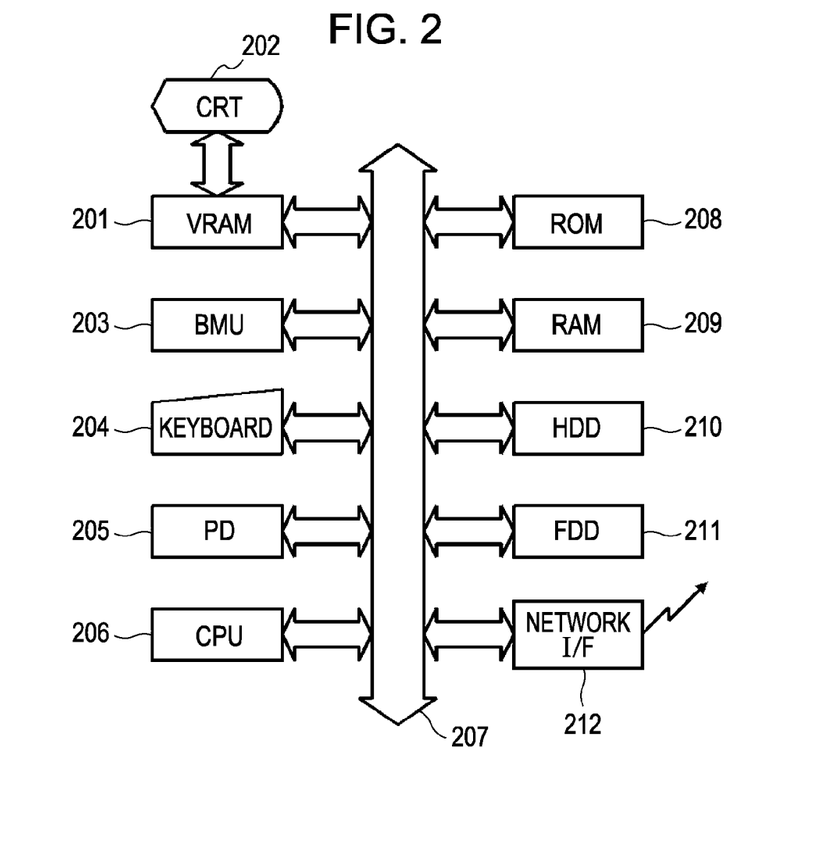
FIG. 2 is a block diagram illustrating an example of the hardware configuration of a server PC and each client PC in FIG. 1.

The server PC 121 and the client PCs 111 to 113 each have a hardware resource as illustrated in FIG. 2 and a software resource as described below.

The server PC 121 receives an instruction from the client PC 111, 112, or 113 and returns the processing result to the browse software (browser) in the client PC that has issued the instruction. The browse software is not restricted as long as it has a compatible browsing function.

According to the present embodiment of the present invention, the communication method including the protocol between the server PC 121 and the client PCs 111 to 113 is not restricted to a specific type.

The configurations of the client PCs 111 to 113 are not restricted as long as the client PCs 111 to 113 are general PCs that can be connected to the LAN 101 and that have hardware resource as illustrated in FIG. 2.

FIG. 2 is a block diagram illustrating an example of the hardware configuration of each of the client PCs 111 to 113 in FIG. 1. The server PC 121 has the same hardware configuration.

Referring to FIG. 2, a video random access memory (VRAM) 201 decomposes characters and images displayed on the screen of a cathode ray tube (CRT) display device 202 and stores the characters and images. A bit move unit (BMU) 203 controls data transfer between memories or between a memory and each device.

A keyboard 204 is provided with various keys used for inputting data. A pointing device (PD) 205 is used to point, for example, an icon on the display.

A central processing unit (CPU) 206 controls the components in the apparatus on the basis of a control program stored in a read only memory (ROM) 208. A program according to an embodiment of the present invention, an error processing program, and programs, described below, for realizing the embodiments of the present invention are also stored in the ROM 208.

A random access memory (RAM) 209 is used as a working area when the CPU 206 executes the programs and as a temporary saving area for the error processing. The RAM 209 is configured so as to enable the capacity to be expanded.

A hard disk drive (HDD) 210 stores applications, the operating system (OS), device drivers, browsers (browse software).

A flexible disk drive (FDD) 211 stores applications and data.

The FDD 211 and the HDD 210 are used for storing application programs, data, databases, and libraries, described below.

A network I/F 212 controls and diagnoses data on a network to perform data transfer between the server PC 121 and the client PCs 111 to 113 over the network.

The components described above are connected to each other via an input-output (I/O) bus 207, which includes an address bus, a data bus, and a control bus.

In the hardware configuration described above, when the apparatus is turned on, the CPU 206 initializes the apparatus in accordance with a boot program in the ROM 208 and loads the OS from the HDD 210 into the RAM 209.

Figure 3:
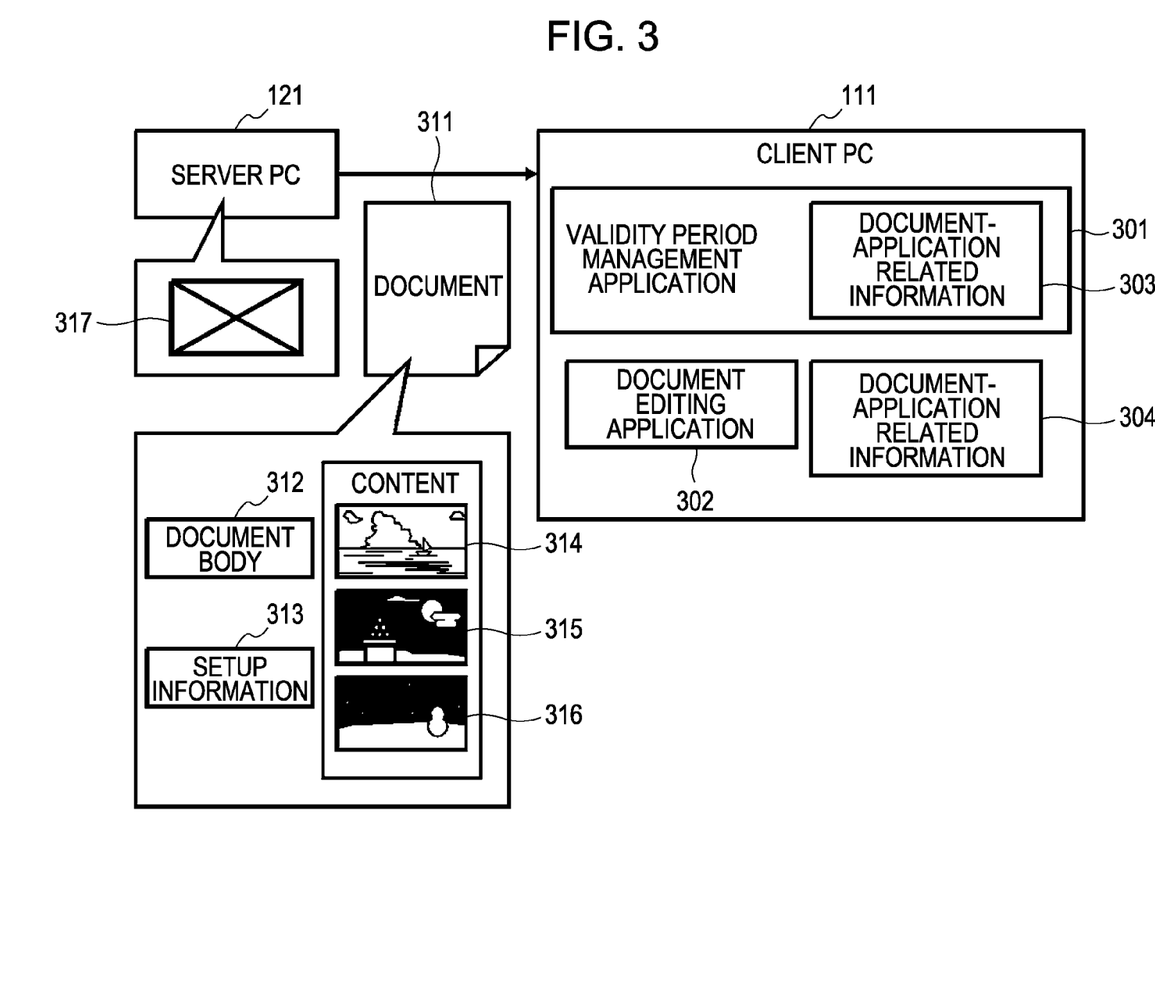
FIG. 3 is a block diagram illustrating an example of a data processing configuration in the server PC and each client PC in FIG. 1.

After the initialization, the CPU 206 invokes a validity period management application 301 and a document editing application 302 illustrated in FIG. 3.

Although the programs are stored in the hard disk or the other because the information processing apparatus according to the present embodiment of the present invention is based on a general-purpose information processing apparatus (such as a personal computer), the programs may be stored in the ROM 208 as an alternative. In other words, the application of the present invention is not restricted by the storage medium.

FIG. 3 is a block diagram illustrating an example of a data processing configuration in the server PC 121 and each of the client PCs 111 to 113 in FIG. 1. The same reference numerals are used in FIG. 3 to identify the same components illustrated in FIG. 1. The client PC is typified by the client PC 111 illustrated in FIG. 1 in the following description.

Referring to FIG. 3, the validity period management application 301 is installed in, for example, the client PC 111 and has a function of managing the validity time periods of the contents of documents or files. The validity period management application 301 is configured separately from the browse software (browser) installed in the client PC 111. In other words, the validity period management application 301 is configured as a module independent of the browser when the function of the validity period management application 301 is expanded or modified.

The validity period management application 301 is stored in the HDD 210 in the client PC 111, is loaded in the RAM 209, and is executed by the CPU 206 to perform a validity period management process.

The document editing application 302 is installed in the client PC 111 and has a function of editing a document transferred from the server PC 121. The document editing application 302 is stored in the HDD 210 in the client PC 111, is loaded in the RAM 209, and is executed by the CPU 206.

Document-application related information 303 is held in the validity period management application 301. The document-application related information 303 indicates the relationship between documents and applications.

Document-application related information 304 is held in the client PC 111. The document-application related information 304 also indicates the relationship between documents and applications. The document-application related information 303 and the document-application related information 304 are stored in the HDD 210 in the client PC 111.

A document 311 is downloaded from the server PC 121 to the client PC 111. The document 311 includes a document body 312, setup information 313, and contents (314, 315, and 316) described below.

Contents 314 to 316 includes information about the validity periods and the initial display position of the document 311. According to the present embodiment of the present invention, a non-displayed content is initially set as the content to be referred to in the document 311 created by the server PC 121.

Figure 7:
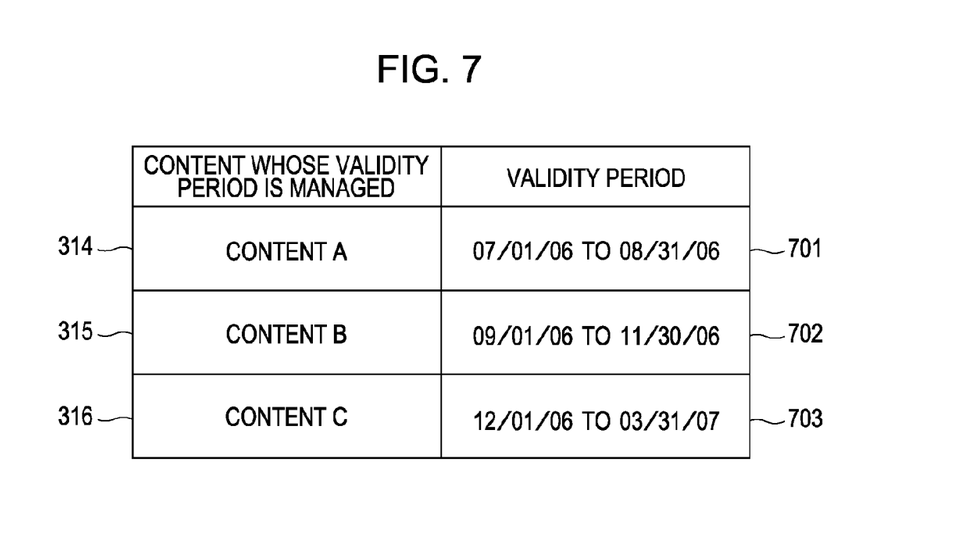
FIG. 7 illustrates management information about contents managed by the client PC in FIG. 1.

The contents 314 to 316 are included in the document 311. For example, as illustrated in FIG. 7, the contents 314 to 316 have different validity periods. The contents 314 to 316 are targets for the validity period management process. The contents 314 to 316 support an open document and the document is processed in an OpenDocument format. Multiple Extensible Markup Language (XML) files and images are compressed in a ZIP format in files in the OpenDocument format. The document 311 includes files having extensions .docx, .xlsx, and .pptx. Theses extensions are registered in the registry in the OS along with the corresponding application names and are managed by the registry in the OS. For example, the content 314 corresponds to a DOCX file, the content 315 corresponds to an XLSX file, and the content 316 corresponds to a PPTX file. In this case, the content 315 can be opened by spreadsheet software and the content 316 can be opened by presentation software. The document 311 is supported in wordprocessor software. When an instruction to open the content 314 is issued, the validity period management application 301 associated with the extension ".docx" is started up. The processing according to the embodiment of the present invention is performed by the validity period management application 301. Then, the processing is moved to the wordprocessor software where display and editing of the document are enabled. In other words, the validity period management application 301 pauses the processing of the application which is to be invoked and which corresponds to a document the operation of which is instructed to perform the validity period management process. Then, the validity period management application 301 operates so as to move to the processing by the application which is to be invoked.

Specifically, the client PC 111 can provide the platform for contents of multiple kinds. The client PC 111 uses a validity period management program, which is an example of the validity period management application 301, to determine the validity period before starting the application corresponding to a content in response to an instruction to open the content.

The association of the extensions of the contents of the multiple kinds with the validity period management application allows the client PC 111 to use the validity period management application 301 to determine the validity period before starting the application corresponding to the type (or kind) of content in response to an instruction to open the content.

A display prohibited content 317, for example, is generated by the server PC 121 or is held in the server PC 121. The display prohibited content 317 indicates that display of the content 314, 315, or 316 is prohibited.

The display prohibited content 317 is displayed instead of the content 314, 315, or 316 if the content is valid i.e. if the validity time period of the content 314, 315, or 316 has expired. The validity period is compared with date information, which can be acquired as timer information about the client PC 111, to determine whether the corresponding content is valid or not i.e. within the validity period or not. The date information can be acquired through the OS.

The client PC 112 or another client PC may have the configuration of the client PC 111.

According to the present embodiment of the present invention, the contents 314 to 316 may be images or may be other types of content, for example, motion pictures, sounds, texts, data files, or programs. Although three content items are included in the document 311 in the example illustrated in FIG. 3, a single content item or any number of content items may be included in the document 311.

Figure 4:
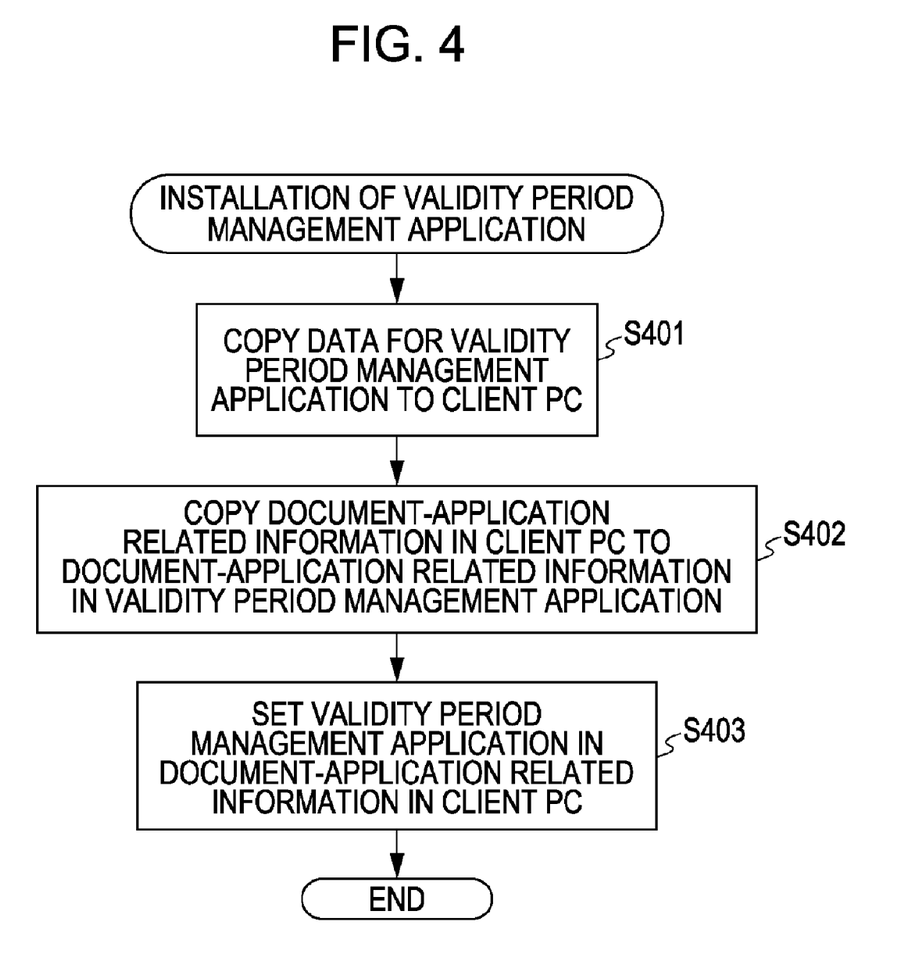
FIG. 4 is a flowchart illustrating an example of first data processing in an information processing apparatus according to an embodiment of the present invention.

FIG. 4 is a flowchart illustrating an example of first data processing in the information processing apparatus according to the first embodiment of the present invention. The data processing is performed when the validity period management application 301 is installed in the client PC 111. "S401" to "S403" in FIG. 4 denote steps. The steps are realized by executing the control program loaded in the RAM 209 by the CPU 206.

After the validity period management application 301 is installed in the client PC 111, in Step S401, data used for executing the validity period management application 301 is copied to the client PC 111. The copied data is stored in the HDD 210. The validity period management application 301 that is stored in a recording medium, such as a flexible disk, may be read out by the FDD 211 and may be installed in the client PC 111. Alternatively, the validity period management application 301 may be downloaded from a service server on the network and may be installed in the client PC 111.

In Step S402, part of the document-application related information 304 in the client PC 111 is copied to the document-application related information 303 in the validity period management application 301. The copied part of the document-application related information 304 is stored in the HDD 210.

The part of the document-application related information 304 that is copied in Step S402 concerns the kind (or type) of document, the validity period which is to be managed, and is associated with the document editing application 302. For example, if the identifier of an application file is to be managed, the identifier associated with the document editing application 302 is included in the document-application related information 303.

In Step S403, the validity period management application 301 is associated with the kind of the document, the validity period of which is to be managed, in the document-application related information 304 in the client PC 111 to set the validity period management application 301. Then, the first data processing in the information processing apparatus is terminated. In this first data processing, the extension associated with the application in which each document is processed is registered in the OS in association with the validity period management application.

With the above data processing, the validity period management application 301 is associated with the documents processed in the client PC. When a document is subsequently acquired from the server PC 121, the validity period management application 301 can control display processing of the contents in the document in accordance with whether the validity time period of the content has expired or not.

Figure 5:
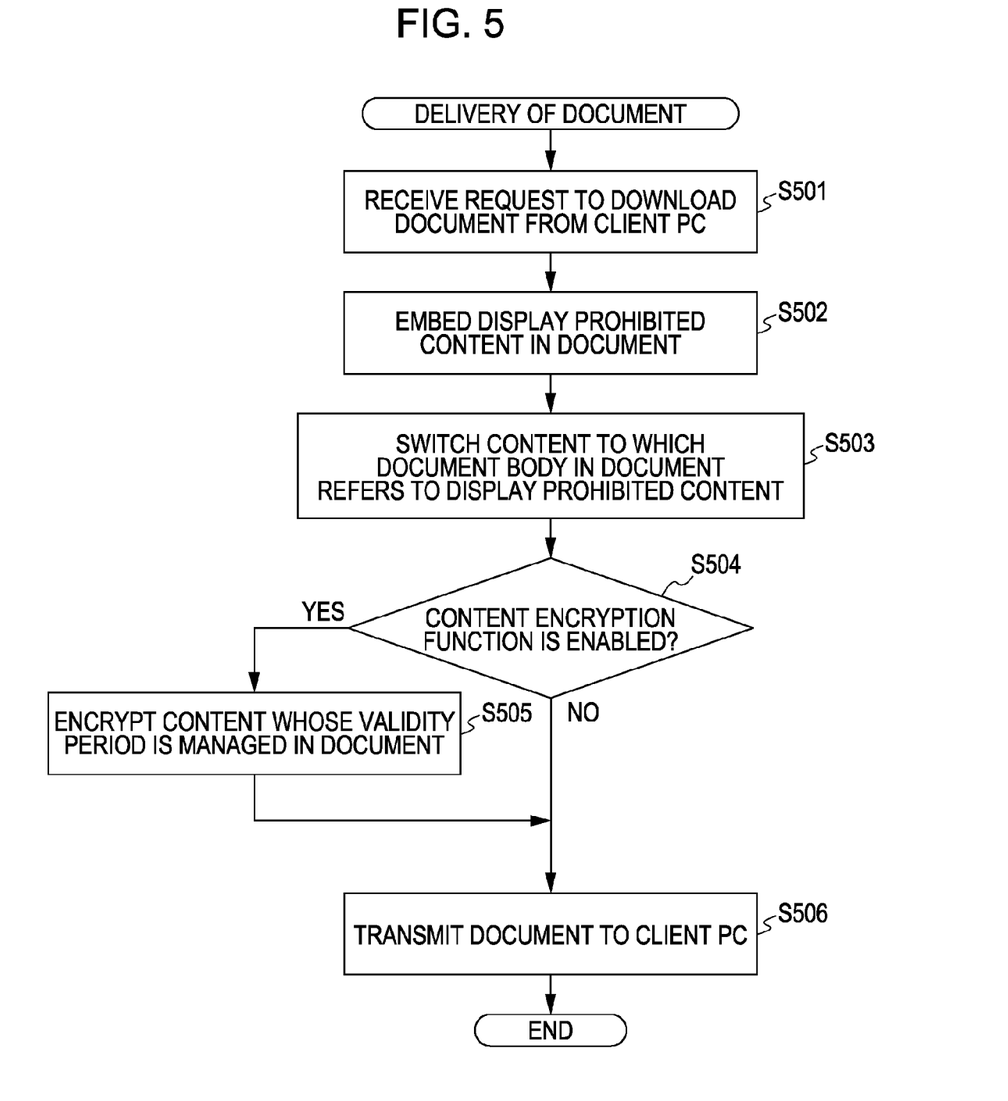
FIG. 5 is a flowchart illustrating an example of first data processing in the server apparatus according to the embodiment of the present invention.

FIG. 5 is a flowchart illustrating an example of first data processing in the server apparatus according to the first embodiment of the present invention. The document 311 is delivered to the client PC 111 by the server PC 121 in FIG. 1 in this data processing. "S501" to S506" in FIG. 5 denote steps. The steps are realized by executing the control program loaded in the RAM 209 by the CPU 206 of the server PC 121.

In Step S501, the server PC 121 receives a request to download the document 311 from the client PC 111. In Step S502, the server PC 121 embeds the display prohibited content 317 in the document 311. It is assumed that the document 311 has the identifier corresponding to a specific application installed in the client PC 111.

In Step S503, the server PC 121 switches the content 314, 315, or 316 to which the document body 312 in the document 311 refers to the display prohibited content 317. The display prohibited content 317 is created by the application in the server PC 121.

In Step S504, the server PC 121 determines whether a content encryption function of the validity period management application 301 is enabled. If the server PC 121 determines that the content encryption function is enabled, then in Step S505, the server PC 121 encrypts the content 314, 315, or 316, the validity period of which is to be managed, in the document 311 by a known encryption method. Then, the process goes to Step S506.

If the server PC 121 determines in Step S504 that the content encryption function is disabled, then in Step S506, the server PC 121 transmits the document 311 to the client PC 111. Then, the first data processing in the server apparatus is terminated.

With the above data processing, the content to be referred to can be switched to the display prohibited content when the content is to be transmitted to the client PC.

Figure 6:
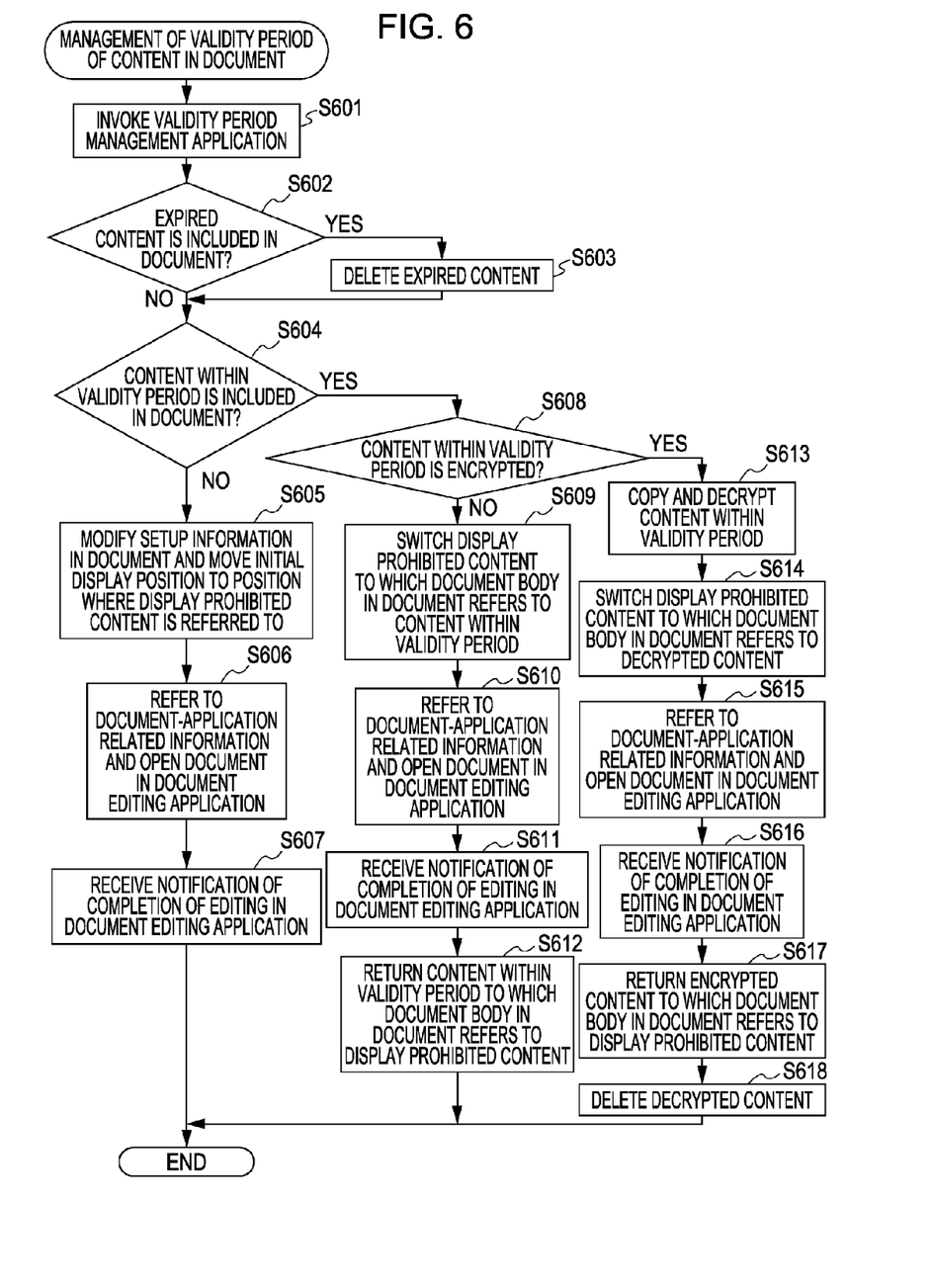
FIG. 6 is a flowchart illustrating an example of second data processing in the information processing apparatus according to the embodiment of the present invention.

FIG. 6 is a flowchart illustrating an example of second data processing in the information processing apparatus according to the embodiment of the present invention. The validity periods of the contents 314 to 316 in the document 311 are managed by the validity period management application 301 in this data processing. "S601" to S618" in FIG. 6 denote steps. The steps are realized by executing the control program loaded in the RAM 209 by the CPU 206.

In Step S601, a user operates, for example, the PD 205 of the client PC 111 to instruct editing of the document 311 transmitted from the server PC 121. The instruction corresponds to a request for processing to the document editing application 302. In response to this request, the document-application related information 304 in the client PC 111 is referred to recognize the extension of the document 311 of which the user instructs editing. Although the document editing application 302 is normally invoked, the validity period management application 301 is invoked in response to the instruction to edit the document because the extension is registered in the registry in the OS in association with the validity period management application 301. All or part of the document-application related information 304 in the client PC 111 is acquired in the validity period management application 301 as the document-application related information 303. An application corresponding to the extension, which is an attribute of the document 311, is invoked as the document editing application 302.

As a result, all or part of the latest document-application related information 304 is acquired as the document-application related information 303. Accordingly, update of the document-application related information can update or modify the application, the validity period of which is to be managed.

In Step S602, the validity period management application 301 determines whether the document 311 includes any content the validity period of which has expired. If the validity period management application 301 determines that the document 311 includes any content the validity period of which has expired, then in Step S603, the validity period management application 301 deletes the expired content from the document 311 and the process goes to Step S604. Display of the expired content can be avoided by this deletion.

If the validity period management application 301 determines in Step S602 that the document 311 does not include any content the validity period of which has expired, then in Step S604, the validity period management application 301 determines whether the document 311 includes any content within the validity period. In other words, the validity period management application 301 determines in Step S604 whether any content set in the document 311 is within its validity period when the processing of the document 311 is requested. If the validity period management application 301 determines in Step S604 that the document 311 does not include any content within the validity period, the process goes to Step S605.

In Step S605, the validity period management application 301 modifies the setup information 313 in the document 311 and changes the initial display position of the document 311, which is a parameter, to the part where the display prohibited content 317 is referred to in the document body 312, thereby moving the initial display position of the document 311 to the part where the display prohibited content 317 is referred to.

In Step S606, the validity period management application 301 refers to the document-application related information 303 in the validity period management application 301 and instructs the OS to open the document 311 in the document editing application 302. When the document 311 is opened, the document editing application 302 refers to the setup information 313, in which the part where the display prohibited content 317 is referred to in the document body 312 is indicated as the initial display position. Accordingly, the part where the display prohibited content 317 is referred to is displayed.

In other words, the location where the document editing application 302 starts the processing is determined on the basis of the content that is to be referred to, and this has been set by the validity period management application 301.

In Step S607, the validity period management application 301 receives a notification of completion of the editing of the document 311 in the document editing application 302. Then, the second data processing in the information processing apparatus is terminated.

If the validity period management application 301 determines in Step S604 that the document 311 includes any content within the validity period, then in Step S608, the validity period management application 301 determines whether the content within the validity period is encrypted. If the validity period management application 301 determines that the content within the validity period is not encrypted, then in Step S609, the validity period management application 301 sets the content to which the document body 312 in the document 311 refers to be the content within the validity period rather than the display prohibited content 317.

In Step S610, the validity period management application 301 refers to the document-application related information 303 in the validity period management application 301 to open the document 311 in the document editing application 302. In Step S611, the validity period management application 301 receives a notification of completion of the editing of the document 311 in the document editing application 302. In Step S612, the validity period management application 301 returns the content within the validity period, to which the document body 312 in the document 311 refers, to the display prohibited content 317. Then, the second data processing in the information processing apparatus is terminated.

If the validity period management application 301 determines in Step S608 that the content within the validity period is encrypted, then in Step S613, the validity period management application 301 copies and decrypts the content within the validity period. In Step S614, the validity period management application 301 sets the display content to which the document body 312 in the document 311 refers to be the decrypted content.

In Step S615, the validity period management application 301 refers to the document-application related information 303 in the validity period management application 301 and opens the document 311 in the document editing application 302.

In Step S616, the validity period management application 301 receives a notification of completion of the editing of the document 311 in the document editing application 302. In Step S617, the validity period management application 301 returns the decrypted content to which the document body 312 in the document 311 refers to the display prohibited content 317. In other words, after the processing in the document editing application 302 is completed, the displayed content is reset to the display prohibited content 317.

In Step S618, the validity period management application 301 deletes the decrypted content. Then, the second data processing in the information processing apparatus is terminated.

According to the present embodiment of the present invention, the content to which the document body 312 in the document 311 refers and which is to be processed by the document editing application 302 is set on the basis of the determination of whether the document includes any content within the validity period in Step S604. In this processing, the document editing application 302 is independent of the function of the validity period management application 301.

With the above data processing, it is possible to set the content to which the document processing application refers on the basis of the validity period of the content included in the document transmitted from the server PC 121.

Accordingly, the display of the content can be restricted if the validity period of the content, set by the document provider, has expired in the editing of the document that has not been referred to for a long time after being transmitted from the server PC 121.

After the content provider transmitted the document to the client PC, the content provider can set the displayed content in accordance with the validity period of the content even without a process of monitoring the document.

In addition, since the content to be displayed can be set independently of the function of the application when the document including the content whose validity period has expired is processed, it is possible to realize a content management function that is not dependent on the application.

Consequently, it is possible to efficiently perform the validity period management process for content items included in the document without any load on the application (such as a video or audio player or word processor) invoked by the client PC.

A content management process in the information processing apparatus according to the embodiment of the present invention will now be described with reference to FIGS. 7 and 8.

FIG. 7 illustrates management information about content items managed by the client PC 111 in FIG. 1. Exemplary information about the validity periods which the document 311 holds in the setup information 313 is illustrated in FIG. 7.

Specifically, the validity periods of the contents 314, 315, and 316 included in the document 311 downloaded from the server PC 121 to the client PC 111 are managed by the validity period management application 301.

Referring to FIG. 7, validity periods 701, 702, and 703 are set for the contents 314, 315, and 316 by the server PC 121. The contents 314, 315, and 136 are displayed only if the validity periods thereof have not expired when the user opens the document 311.

Figure 8:
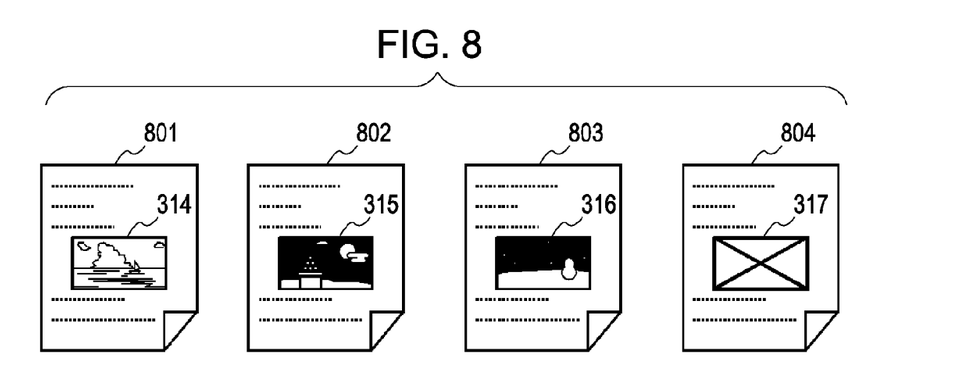
FIG. 8 illustrates examples of contents displayed in a document in FIG. 3.

FIG. 8 illustrates examples of content items displayed in the document 311 in FIG. 3. The content or contents determined on the basis of the date when the document 311 is opened by the document editing application 302 are displayed in the example in FIG. 8.

Referring to FIG. 8, reference numerals 801 to 804 denote pages of the displayed document. If the contents 314, 315, and 316 are within the validity periods 701, 702, and 703, respectively, when the document 311 is opened, the contents 314 to 316 are displayed in the pages 801 to 803, respectively.

The page 804 has the display prohibited content 317 displayed therein because the contents 314 to 316 are not within the validity periods 701 to 703, respectively, when the document 311 is opened.

The management of the validity periods of the contents, illustrated in FIGS. 7 and 8, will now be described with reference to the flowcharts in FIGS. 5 and 6. It is assumed that the content encryption function of the validity period management application 301 is enabled.

First Content Processing

In Step S501 in FIG. 5, the server PC 121 receives a request to download the document 311 from the client PC 111. In Step S502, the server PC 121 embeds the display prohibited content 317 in the document 311. The server PC 121 may hold the display prohibited content 317 or may execute an image editing program to create the display prohibited content.

In Step S503, the server PC 121 substitutes the content 314, 315, or 316, to which the document body 312 in the document 311 refers, with the display prohibited content 317.

In Step S504, the server PC 121 determines whether the content encryption function of the validity period management application 301 in the client PC 111 is enabled. Since the content encryption function is enabled here, in Step S505, the server PC 121 encrypts the content 314, 315, or 316, the validity period of which is to be managed, in the document 311. Then, the process goes to Step S506.

In Step S506, the server PC 121 transmits the document 311 to the client PC 111. Then, the first data processing in the server apparatus is terminated.

It is assumed that the user instructs editing of the document 311 with the PD 205 in the client PC 111, for example, on Aug. 1, 2006 (the current date in the client PC 111).

In Step S601 in FIG. 6, the document-application related information 304 in the client PC 111 is referred to to invoke the validity period management application 301.

In Step S602, the validity period management application 301 determines whether the document 311 includes any content the validity period of which has expired.

For example, on Aug. 1, 2006, since none of the validity periods 701 to 703 of the contents 314 to 316 in the document 311 in FIG. 7 has expired, the process goes to Step S604 without any processing. Specifically, the contents 314 to 316 are displayed or printed.

In Step S604, the validity period management application 301 determines whether the document 311 includes any content within the validity period. Since the validity period 701 includes Aug. 1, 2006 (the current date in the client PC 111), the content 314 is within the validity period.

In Step S608, the validity period management application 301 determines whether the content 314 within the validity period is encrypted. Since the content 314 within the validity period is encrypted, then in Step S613, the validity period management application 301 copies and decrypts the content 314 within the validity period.

In Step S614, the validity period management application 301 substitutes the display prohibited content 317, to which the document body 312 in the document 311 transmitted from the server PC 121 refers, with the decrypted content. As a result, the page 801 in FIG. 8 is set to be displayable in the CRT display device 202.

In Step S615, the validity period management application 301 refers to the document-application related information 303 in the validity period management application 301 and opens the document 311 in the document editing application 302.

The document editing application 302 displays the content 314 within the validity period in the CRT display device 202, as in the page 801 in FIG. 8.

In Step S616, the validity period management application 301 receives a notification of completion of the editing of the document 311 in the document editing application 302. In Step S617, the validity period management application 301 returns the decrypted content, to which the document body 312 in the document 311 refers, to the display prohibited content 317. In other words, after the processing in the document editing application 302 is completed, the display prohibited content 317 that was initially set is reset as the content to be referred to.

In Step S618, the validity period management application 301 deletes the decrypted content. Then, the second data processing in the information processing apparatus is terminated.

Second Content Processing

It is now assumed that the user operates the PD 205 to instruct editing of the document 311 in the client PC 111 on Jan. 1, 2007.

In Step S601, the document-application related information 304 in the client PC 111 is referred to. Since the invocation of the validity period management application 301 is registered in the document-application related information 304, the validity period management application 301 is invoked. The document-application related information based on the document-application related information 304 that is referred to is acquired as the document-application related information 303.

In Step S602, the validity period management application 301 determines whether the document 311 includes any content whose validity period has expired.

Since the validity periods 701 and 702 have expired on Jan. 1, 2007 when the request to edit the document 311 is submitted, as illustrated in FIG. 7, in Step S603, the contents 314 and 315 whose validity periods have expired are deleted from the document 311.

In Step S604, the validity period management application 301 determines whether the document 311 includes any content within the validity period. Since the validity period 703 includes Jan. 1, 2007, as illustrated in FIG. 7, the content 316 is within the validity period.

In Step S608, the validity period management application 301 determines whether the content 316 within the validity period is encrypted. Since the content 316 within the validity period is encrypted, then in Step S613, the validity period management application 301 copies and decrypts the content 316 within the validity period.

In Step S614, the validity period management application 301 substitutes the display prohibited content 317, to which the document body 312 in the document 311 refers, with the decrypted content.

In Step S615, the validity period management application 301 refers to the document-application related information 303 in the validity period management application 301 and opens the document 311 in the document editing application 302.

The document editing application 302 displays the content 316 within the validity period in the CRT display device 202, as in the page 803 illustrated in FIG. 8.

In Step S616, the validity period management application 301 receives a notification of completion of the editing of the document 311 in the document editing application 302. In Step S617, the validity period management application 301 returns the decrypted content, to which the document body 312 in the document 311 refers, to the display prohibited content 317.

In Step S618, the validity period management application 301 deletes the decrypted content. Then, the second data processing in the information processing apparatus is terminated.

Third Content Processing

It is now assumed that the user operates the PD 205 to instruct editing of the document 311 in the client PC 111 on Apr. 1, 2007.

In Step S601, the document-application related information 304 in the client PC 111 is referred to invoke the validity period management application 301. In Step S602, the validity period management application 301 determines whether the document 311 includes any content whose validity period has expired.

Since the validity period 703 has expired on Apr. 1, 2007, then in Step S603, the content 316 whose validity period has expired is deleted from the document 311.

In Step S604, the validity period management application 301 determines whether the document 311 includes any content within the validity period. Since the validity periods 701 to 703 have expired on Apr. 1, 2007, the validity period management application 301 determines that the document 311 includes no content within the validity period.

In Step S605, the validity period management application 301 modifies the setup information 313 in the document 311 and changes the initial display position of the document 311, which is a parameter, to the part where the display prohibited content 317 is referred to in the document body 312.

In Step S606, the validity period management application 301 refers to the document-application related information 303 in the validity period management application 301 and instructs the OS to open the document 311 in the document editing application 302.

When the document 311 is opened, the display prohibited content 317 is displayed in the CRT display device 202 in accordance with the initial display position in the setup information 313, as in the page 804.

In Step S607, the validity period management application 301 receives a notification of completion of the editing of the document 311 in the document editing application 302. Then, the second data processing in the information processing apparatus is terminated.

According to the present embodiment of the present invention, the client PC can determine the processing for a content included in a document transmitted from the server PC, independently of the document browsing or editing program. Specifically, it is possible to prohibit the browsing or editing of the content if the validity period of the content has expired.

It is also possible to notify the user of the expiration of the validity period of any content included in the document.

Alternatively or in addition, it is possible to switch a content item included in the document to another content item depending on the date.

It is also possible to prevent unauthorized use of contents included in the document.

The display prohibited content 317 is referred to from the document body in the document delivered from the server PC. Accordingly, it is possible to prevent any content whose validity period has expired from being erroneously browsed or edited if the encryption function is not used and the validity period management application 301 in the client PC is not installed.

The configuration of data processing programs capable of being read by the information processing apparatus and the server apparatus according to the embodiment of the present invention will now be described with reference to memory maps in FIGS. 9 and 10.

Figure 9:
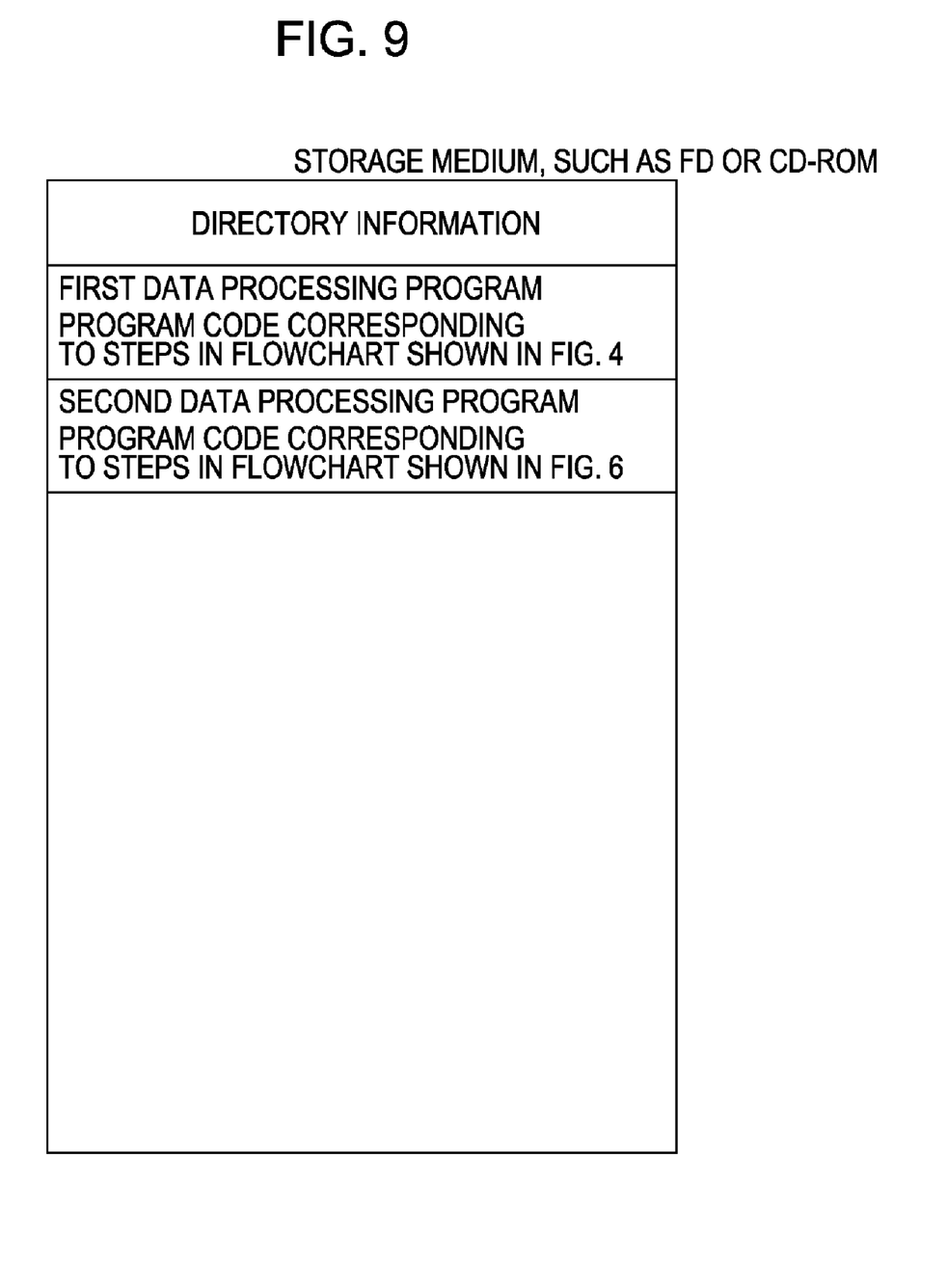
FIG. 9 illustrates an example of the memory map of a storage medium storing various data processing programs that can be read out by the information processing apparatus according to the embodiment of the present invention.

FIG. 9 illustrates an example of the memory map of the storage medium storing various data processing programs that can be read by the information processing apparatus according to the embodiment of the present invention.

Figure 10:
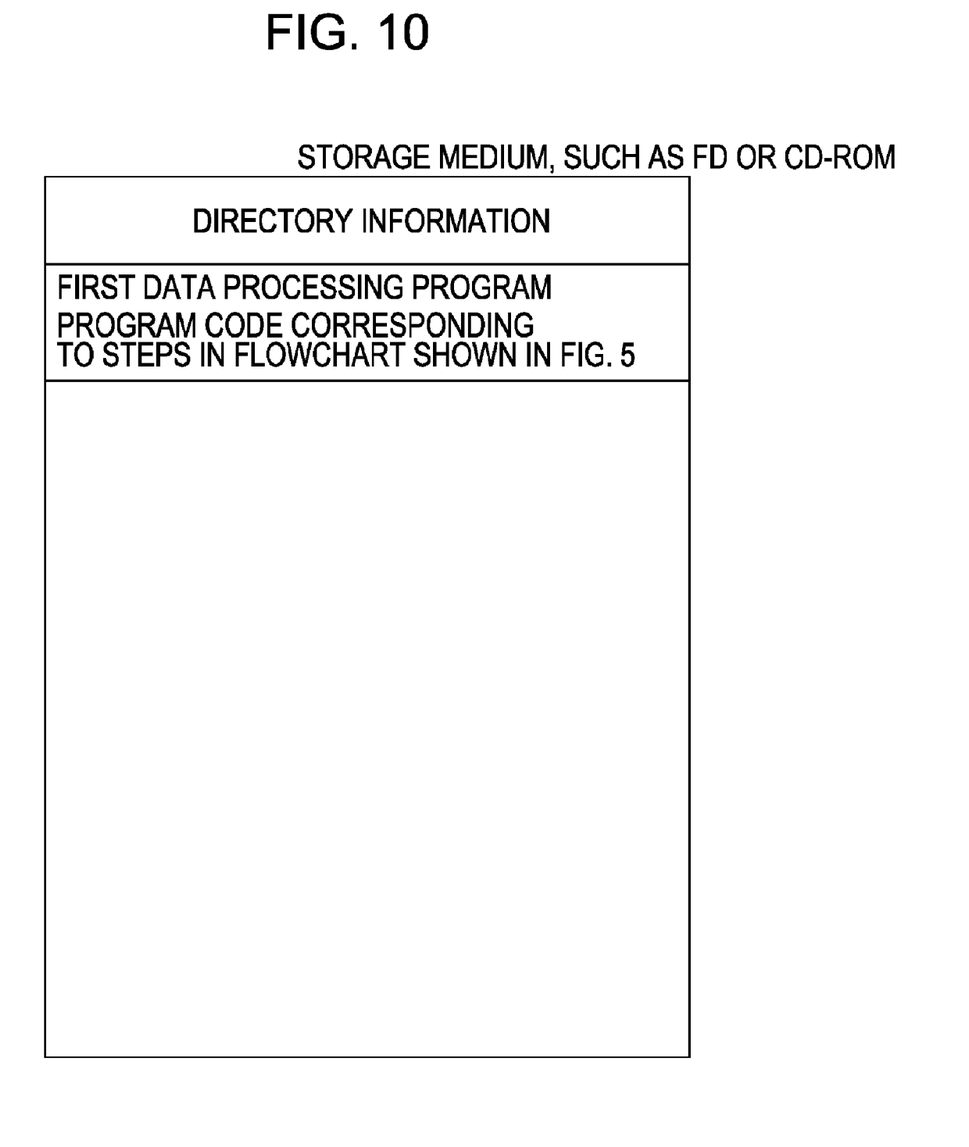
FIG. 10 illustrates an example of the memory map of a storage medium storing various data processing programs that can be read out by the server apparatus according to the embodiment of the present invention.

FIG. 10 illustrates an example of the memory map of the storage medium storing various data processing programs that can be read by the server apparatus according to the embodiment of the present invention.

Although not particularly illustrated, both information used for managing the programs stored in the storage medium, such as version information and creator information, and the information dependent on the OS of the apparatus that reads out the programs, such as icons used for identifiably displaying the programs, may be stored in the storage medium.

The data in the various programs is managed in directories. In addition, programs used for installing the various programs in the computer and programs used for decompressing the programs when the installed programs are compressed may also be stored in the storage medium.

The functions illustrated in FIGS. 4 to 6 according to the embodiments of the present invention may be executed by a host computer by using programs that are externally installed. In such a case, pieces of information including the programs may be supplied to an output apparatus from a storage medium, such as a compact disc-read only memory (CD-ROM) or a flexible disk (FD), or from an external storage medium over a network.

As described above, the present invention can be embodied by supplying the storage medium storing software program code realizing the functions according to the above embodiments to a system or an apparatus, the computer (or CPU or micro processing unit (MPU) in which system or apparatus reads out and executes the program code stored in the storage medium.

In this case, the present invention is embodied by the program code itself read out from the storage medium. The present invention is applicable to the storage medium storing the program code.

Accordingly, the program code may be object codes, programs executed by an interpreter, or script data supplied to the OS as long as the program code has the function of the programs.

The storage medium supplying the programs may be, for example, a flexible disk, a hard disk, an optical disk, a magneto-optical disk (MO), a CD-ROM, a compact disc recordable (CD-R), a compact disc rewritable (CD-RW), a magnetic tape, a nonvolatile memory card, a ROM, or a digital versatile disc (DVD).

The computer programs according to the embodiments of the present invention or files that are compressed and that include an automatic installation function may be downloaded from a Web page on the Internet, which is accessed by using the browser of the client computer, in a recording medium, such as a hard disk. Alternatively, the program code composing the programs according to the embodiments of the present invention may be divided into multiple files that are downloaded from different Web pages. In other words, the present invention is embodied by the Web server or ftp server from which multiple users download the program files realizing the functions according to the embodiments of the present invention in the computer.

The programs according to the embodiments of the present invention, which are encrypted and stored in a storage medium such as a CD-ROM, may be distributed to users. In this case, users satisfying predetermined conditions may be allowed to download cryptographic-key information for deciphering the code from a Web page over the Internet and may execute and install the programs deciphered by using the downloaded cryptographic-key information in the computer.

The computer that executes the readout program code realizes the functions of the embodiments described above. In addition, the OS or the like running on the computer may execute all or part of the actual processing based on instructions in the program code to realize the functions of the embodiments described above.

Alternatively, after the program code read out from the storage medium has been written in a memory that is provided in a function expansion board included in the computer or in a function expansion unit connected to the computer, the CPU or the like in the function expansion board or the function expansion unit may execute all or part of the actual processing based on instructions in the program code to realize the functions of the embodiments described above.

Although in the above embodiments the apparatus and method of the present invention have been described with reference to documents, it is to be understood that the term document can include data files having content items including video and/or audio files or other data playable on a variety of media players.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-167933 filed Jun. 26, 2007, which is hereby incorporated by reference herein in its entirety.

What is claimed is:

1. An information processing apparatus for processing documents, the apparatus comprising:
    a data processing unit configured to process the documents;
    a determining unit operable, in response to a request to the data processing unit to process one document among the documents, to execute a validity period management procedure to determine whether the request is issued within a validity period associated with a given content item in the document; and
    a switching unit configured to switch a content item that is referred to by the data processing unit according to a result of the determination by the validity period management procedure,
    wherein the documents are initially set so that the data processing unit refers to a different content item which is data indicating prohibited contents when being displayed on a display, and
    wherein the switching unit switches from the different content item to the given content item when the result of the determination by the validity period management procedure indicates that the request is issued within the validity period.

2. The information processing apparatus according to claim 1,
    wherein the apparatus includes the display, and the apparatus is configured to display the given content item.

3. The information processing apparatus according to claim 1,
    wherein the switching unit resets the given content item to be the further different content item after the processing by the data processing unit is completed.

4. The information processing apparatus according to claim 1,
    wherein the page where the data processing unit starts the processing is determined on the basis of the content item that is to be referred to and that is switched by the switching unit.

5. The information processing apparatus according to claim 1,
    wherein the validity periods of the content items included in the documents are set in advance by a content provider.

6. The information processing apparatus according to claim 1, wherein the information processing apparatus provides a platform for content items of two or more kinds, and is configured to use a validity period management program to perform the processing by the determining unit before invoking the application corresponding to a content item in response to an instruction to open the content item.

7. The information processing apparatus according to claim 6,
wherein the information processing apparatus associates the extensions of content items of two or more kinds with the validity period management program, and is configured to use the validity period management program to perform the processing by the determining unit before invoking the application corresponding to a content item in response to an instruction to open the content item.

8. The information processing apparatus according to claim 1, the apparatus being configured to process documents of two or more kinds generated by applications of two or more different kinds.

9. The information processing apparatus according to claim 8,
wherein the extensions of the documents of multiple kinds are registered in an operating system in association with a validity period management program, and the determining unit invokes the validity period management program on the basis of the extension registered for one document among the documents of multiple kinds to perform the determination.

10. An information processing method for processing documents, the method comprising the steps of:
processing documents by a data processing unit;
executing a validity period management procedure in response to a request to process a document to determine whether the request is issued within a validity period associated with a given content item in the document; and
switching a content item, by a switching unit, that is referred to by the data processing unit according to a result of the determination by the validity period management procedure,
wherein the documents are initially set so that the data processing unit refers to a different content item which is data indicating prohibited contents when being displayed on a display, and
wherein the switching unit switches from the different content item to the given content item when the result of the determination by the validity period management procedure indicates that the request is issued within the validity period.

11. The information processing method according to claim 10, further comprising switching the content item to be referred to such that the given content item is displayed.

12. The information processing method according to claim 10, further comprising resetting the displayed content item to a display prohibited content item after the processing in the data processing step is completed.

13. The information processing method according to claim 10,
wherein the page where processing of the document starts is determined on the basis of the content item that is to be referred to and that is switched in the switching step.

14. The information processing method according to claim 10, for processing documents of two or more different kinds.

15. The information processing method according to claim 14,
wherein the extensions of the documents of two or more different kinds are registered in an operating system in association with a validity period management program, and the determining step invokes the validity period management program on the basis of the extension registered for one document among the documents of multiple kinds to perform the determination.

16. The information processing method according to claim 10,
wherein the validity periods of the content items included in the documents are set in advance by a content provider.

17. The information processing method according to claim 10,
wherein the information processing method provides a platform for content items of two or more kinds and uses a validity period management program to perform the processing in the determining step before invoking the application corresponding to a content item in response to an instruction to open the content item.

18. The information processing method according to claim 17,
wherein the information processing method associates the extensions of the content items of two or more kinds with the validity period management program and uses the validity period management program to perform the processing in the determining step before invoking the application corresponding to a content item in response to an instruction to open the content item.

19. A storage medium storing a computer program which when loaded into an information processing apparatus and executed performs the method according to claim 10.

* * * * *